(12) United States Patent
Carrera Arenas et al.

(10) Patent No.: US 11,044,900 B2
(45) Date of Patent: Jun. 29, 2021

(54) EQUIPMENT FOR THE CONTROL AND DOSAGE OF CHEMICAL PRODUCTS FOR AGRICULTURAL SOIL DISINFECTION MACHINES

(71) Applicant: AGROQUIMICOS DE LEVANTE, S.A., Valencia (ES)

(72) Inventors: Antonio Carrera Arenas, Cheste (ES); Santiago Alegre Sosa, Cheste (ES)

(73) Assignee: AGROQUIMICOS DE LEVANTE, S.A., Valencia (ES)

( * ) Notice: Subject to any disclaimer, the term of this patent is extended or adjusted under 35 U.S.C. 154(b) by 200 days.

(21) Appl. No.: 16/096,909

(22) PCT Filed: Apr. 28, 2016

(86) PCT No.: PCT/ES2016/070323
§ 371 (c)(1),
(2) Date: Oct. 26, 2018

(87) PCT Pub. No.: WO2017/186976
PCT Pub. Date: Nov. 2, 2017

(65) Prior Publication Data
US 2019/0124908 A1    May 2, 2019

(51) Int. Cl.
*A01M 13/00* (2006.01)
*A01M 7/00* (2006.01)
*H02K 49/10* (2006.01)

(52) U.S. Cl.
CPC .......... *A01M 13/00* (2013.01); *A01M 7/0089* (2013.01); *H02K 49/104* (2013.01)

(58) Field of Classification Search
CPC ...... A01M 13/00; A01M 7/0089; A01M 7/00; H02K 49/104; H02K 49/10; H02K 49/00
See application file for complete search history.

(56) References Cited

U.S. PATENT DOCUMENTS

| | | | |
|---|---|---|---|
| 4,467,961 | A | 8/1984 | Coffee et al. |
| 5,611,679 | A | 3/1997 | Ghosh et al. |
| 5,911,362 | A | 6/1999 | Wood et al. |
| 6,065,686 | A | 5/2000 | Betts-Williams et al. |
| 2002/0030119 | A1 | 3/2002 | Proharam |

FOREIGN PATENT DOCUMENTS

| | | |
|---|---|---|
| ES | 2008798 A6 | 8/1989 |
| ES | 1046958 U | 2/2001 |

OTHER PUBLICATIONS

International Search Report and Written Opinion issued in corresponding PCT Application No. PCT/ES2016/070323, dated Jan. 24, 2017.

*Primary Examiner* — Christopher J. Novosad
(74) *Attorney, Agent, or Firm* — Westman, Champlin & Koehler, P.A.

(57) ABSTRACT

Chemical product control and metering equipment for agricultural land disinfection machines with at least two receptacles for containing chemical products and an injector for injecting the products on agricultural land, comprising includes a product metering frame, a control panel of the metering frame, wirelessly connected thereto, and an electronic control card. The metering frame includes a chemical product inlet duct, an electrovalve, and a dose control flowmeter connected to the inlet ducts and to a hydraulic pump, which has at least one product outlet duct. The electronic control card is arranged inside the metering frame and is connected to a motor, the dose control flowmeter, and the electrovalves.

9 Claims, 3 Drawing Sheets

EQUIPMENT FOR THE CONTROL AND DOSAGE OF CHEMICAL PRODUCTS FOR AGRICULTURAL SOIL DISINFECTION MACHINES

CROSS-REFERENCE TO RELATED APPLICATION

This Application is a Section 371 National Stage Application of International Application No. PCT/ES2016/070323, filed Apr. 28, 2016, and published as WO/2017/186976 on Nov. 2, 2017, in Spanish, the contents of which are hereby incorporated by reference in their entirety.

TECHNICAL FIELD OF THE INVENTION

The present invention corresponds to the technical field of agricultural land disinfection machines, specifically to the chemical product control and metering equipment thereof, where said machines have at least two receptacles for chemical products and at least one injector for injecting the products on agricultural land.

BACKGROUND OF THE INVENTION

There are many agricultural land disinfection systems today the objective of which is to enable treating lands in a phytosanitary manner to eliminate parasites such as fungi and bacteria existing therein and to prepare them for the most optimal possible soil working.

These systems usually have receptacles containing chemical fumigation product which are arranged on a trailer secured on traction means such as a tractor. Furthermore, they also usually have injectors for product output and a distributor for product distribution.

Reference documents ES1046958 and ES2008798 can be mentioned as an example of the state of the art.

Reference document ES1046958 defines a fumigating receptacle which has a horizontal cylindrical shape for a homogenous and effective fumigation of agricultural fields and is intended to be arranged on the platform of a trailer with rolling means so that it can be driven by a tractor.

This receptacle has a product inlet for the entry of product from a suitable storage container, in one of the upper and end parts of the receptacle, through conduits associated with a pump for drawing in the product itself. There is established in the same area the product outlet for the exit of product towards a tap allowing the passage thereof towards a distribution head located in the lower portion with respect to the platform of the load trailer for transport, a plurality of narrow conduits ending in corresponding downward facing spray nozzles emerging radially from the head.

Performing the action of disinfection usually involves a piston pump for application thereof by means of irrigation, such that the flow and pressure thereof have the drawback of not being constant. Furthermore, this pump, if used for disinfection on a machine, causes flow imbalances in each of the injectors as it does not have a constant pressure. Another significant drawback is the safety during application, given that the injected chemical product is very aggressive and causes the mechanical closures and gaskets commonly used in such pumps to deteriorate over time. This can cause continuous leaks of product during the process of application.

To solve this problem of the lack of flow continuity, there are other types of fumigation systems, in which nitrogen inside cylinders of considerable dimensions is used to extract the disinfectant product inside other cylinders that must be adapted for cooperating with the mentioned nitrogen cylinders. In these cases, flow continuity is indeed achieved, but regulation of the dose to be applied is estimated. In addition to requiring space in the machines for arranging the nitrogen cylinders, this solution has significant drawbacks with respect to the handling thereof due to the size, which tends to require a few operators, as well as to the economic cost and logistics to again transport said cylinders to installations that are often far away for their new reposition.

Reference document ES2008798 discloses improvements introduced in agricultural land fumigation machines which are formed by a general framework having a platform for supporting containers or cylinders containing a fumigation gas, in this case methyl bromide. These machines include control means, distributing and channeling said gas towards earth moving coulters, and also include ground sealing means based on a polyethylene film which is gradually unrolled as the entire machine moves forward, all this in collaboration with means opening furrow for housing the edge of the mentioned film, wheels for introducing that film in said furrow, a plough for returning soil into the furrow and a wheel for rolling over such soil in order to set and seal the land over which the machine passes. This machine further comprises on the platform for supporting the cylinders or containers containing fumigant, a scale for controlling metering and for preventing inoperative passes from being able to be performed because fumigant is not injected.

In this case, the most efficient specific gas consumption varies in each application depending on the different parameters, such as for example, the type of land, the type of pests to be eradicated, crops, etc. Therefore, once the optimal dosage has been decided and the surface to be treated known, the amount of fumigant required for performing the treatment is known.

More than one injector is usually arranged in said machines, such that in those cases in which the machines comprise a large number of injectors, said machines do not have an operation in optimum conditions since they fail to apply the same dose in all the injectors. Furthermore, they do not have a blockage detection system, so a homogeneous distribution of the disinfectant product on the entire surface of the land to be disinfected is not achieved.

Likewise, another drawback of the machines existing in the state of the art is that different receptacles for chemical product to be sprayed are used and there is a need to change these receptacles when they become empty, the presence of an operator for regulating and readjusting the dose depending on the earlier parameters being necessary.

These fumigation systems found in traction machines operate as the vehicle gradually moves over the land and therefore in the direction of travel thereof. After a first pass in a first direction, the traction vehicle must be turned changing the direction of travel such that it is opposite the previously indicated direction and so on and so forth until covering the entire extension of the land. A problem that arises in the turning sections of the vehicle is that there is no control over the product to be sprayed, the operator must manually stop its application and, once having turned the vehicle, proceed to again open and regulate the system for applying the product to be sprayed.

DESCRIPTION OF THE INVENTION

The chemical product control and metering equipment for agricultural land disinfection machines herein proposed has at least two receptacles for containing said chemical products and at least one injector for injecting same on agricultural land.

Said control and metering equipment comprises a product metering frame, a control panel of the metering frame, wirelessly connected thereto, and an electronic control card.

The product metering frame has two inlet connections for entry into the frame, each with a suction tube of the receptacles for chemical product and, at least one outlet connection for the exit to an injector for injecting said product. The invention further comprises therein a chemical product inlet duct connected to each of the inlet connections, an electrovalve at the beginning of each of the connections and at least one dose control flowmeter connected to said inlet ducts and to a hydraulic pump.

The hydraulic pump is in turn connected to an electric motor by means of a magnetic coupling and has at least one product outlet duct connected to the at least one outlet connection of the metering frame.

Likewise, the electronic control card is arranged inside the metering frame and connected to the motor, the dose control flowmeter and the electrovalves, and is wirelessly connected with the control panel.

According to a preferred embodiment, the inlet connections for entry into the metering frame comprise a particle filter.

According to a preferred embodiment, the magnetic coupling between the electric motor and the hydraulic pump is formed by at least two magnets.

In this case and according to a preferred embodiment, said magnets of the magnetic coupling are neodymium magnets.

According to a preferred embodiment, each product outlet duct is connected to a blockage detection flowmeter, before the outlet connection of the metering frame, where said blockage detection flowmeters are in turn connected with the electronic control card.

In a preferred embodiment, the metering frame comprises a through hole for power supply means.

According to another aspect and according to a preferred embodiment, the control panel comprises a charging connector on one of its sides.

In a preferred embodiment, the control panel comprises means for indicating the parameters of the equipment formed by a display.

According to a preferred embodiment, the control panel comprises a potentiometer for regulating the dose of product leaving through the injector.

According to a preferred embodiment, the metering frame comprises a selector knob for manually or automatically controlling which of the metering receptacle is chosen.

A significant improvement over the state of the art is obtained with the chemical product control and metering equipment for agricultural land disinfection machines herein proposed.

This is because it has many advantages, such as the fact that with this equipment it is possible to contain the chemical product in disposable containers, both during transport to the area of application and in the machine itself, because it is unnecessary to subject the product to pressure conditions for extraction thereof from the inside of the receptacle, there is therefore no need for the existence of specific containers adapted for working with chemical products subjected to a pressure conditions, as in pieces of equipment using nitrogen cylinders as a chemical product propelling element.

Furthermore, not using these nitrogen cylinders allows obtaining logistics improvements, in terms of transport, filling and replacement, and arrangement in the machine, as well as a significant cost reduction.

Likewise, safety during application of the product is greatly increased by using magnetic-driven metering pump. That is due to fact that they have neither mechanical closures nor sealing gaskets that may deteriorate and through which the chemical product may leak out.

This equipment allows full, remote control from the control panel which can be located in the tractor. Furthermore, since this control panel is connected with the electronic control card and the latter is connected with the blockage detection flowmeters, when a blockage occurs, the electronic card obtains information from the flowmeters such that it communicates with the control panel, providing it with information relating to the existence of a blockage, the degree of blockage, as well as the injector or injectors with said blockage. A warning is generated in the control panel monitoring this information, so that the blockage can be quickly located and cleared.

The total liters metered, as well as the exact dose in liters per minute being sprayed at a given moment, are also monitored.

The control panel also issues a warning when it detects that one of the receptacles is empty, the suction being automatically changed from that receptacle to another full receptacle.

With that equipment, the dose can be continuously regulated between 0 and a maximum of liters per minute.

Likewise, the same amount of product can be metered for each of the injectors, thereby obtaining a homogeneous product distribution on the surface to be treated.

The invention also solves the problem of those machines when they have to change direction and there is a need, to that end, to stop fumigation and to again regulate the dose thereafter. With this equipment, it is possible to perform temporary shutdowns for changing the direction of travel of the tractor and then resuming the travel and spraying the programmed dose, which does not need to be readjusted, given that the doses are stored in the memory of the electronic control card.

Furthermore, the invention relates to fumigation equipment suitable for being able to be arranged on a trailer secured on traction vehicle, or on a disinfection machine which is also towed by a traction vehicle.

The invention therefore relates to a control and metering equipment that is very efficient, practical and versatile, while at the same more economical and easier to handle.

BRIEF DESCRIPTION OF THE DRAWINGS

For the purpose of aiding to better understand the features of the invention according to a preferred practical embodiment thereof, a set of drawings is attached as an integral part of said description in which the following has been depicted with an illustrative and non-limiting character.

DETAILED DESCRIPTION OF A PREFERRED EMBODIMENT OF THE INVENTION

Figure 1:
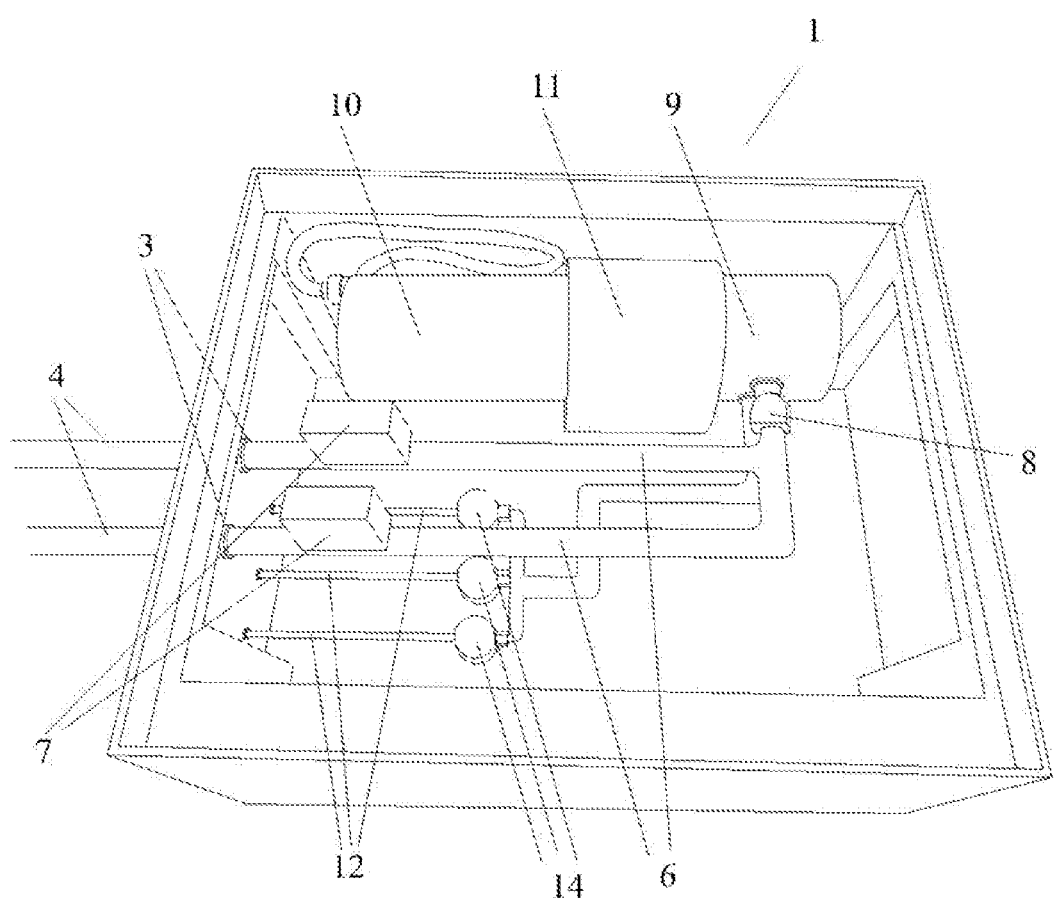
FIG. 1 shows a schematic perspective view from the lower face of the product metering frame of the chemical product control and metering equipment, for a preferred embodiment of the invention.

The provided drawings show how in a preferred embodiment of the invention, the chemical product control and metering equipment for agricultural land disinfection machines herein proposed has six receptacles (not depicted in the drawings) for containing said chemical products and three injectors (not depicted in the drawings) for injecting the products on the agricultural land, one injector being arranged on the left, another injector in the center and the third injector on the right. In this preferred embodiment of the invention, the equipment is arranged on a trailer of a tractor and the six receptacles are arranged such that there are three receptacles on each side of the machine.

This control and metering equipment comprises a product metering frame 1, a control panel 2 of the metering frame, wirelessly connected thereto, and an electronic control card. In this preferred embodiment of the invention, the wireless connection of the control panel is performed through WiFi.

As shown in FIG. 1, the product metering frame 1 having two inlet connections 3 for entry into the frame, each with a suction tube 4 of the receptacles for chemical product. Each inlet connection 3 corresponds with a receptacle of one of the sides of the machine.

It has furthermore three outlet connections 5 for the exit to the three injectors for said product. Likewise, the metering frame 1 has therein a chemical product inlet duct 6 connected to each of the two inlet connections 3, an electrovalve 7 at the beginning of each of the connections, at least one dose control flowmeter 8 connected to said inlet ducts 6 and to a hydraulic pump 9.

Said hydraulic pump 9 is connected to an electric motor 10 by means of a magnetic coupling 11 and has three product outlet ducts 12 connected respectively to the three outlet connections 5 of the metering frame 1.

The electronic control card is arranged inside the metering frame 1 and connected to the motor 10, the dose control flowmeter 8 and the electrovalves 7, and is furthermore wirelessly connected, in this case through WiFi, with the control panel 2.

In this preferred embodiment of the invention, the dose control flowmeter 8 is a paddle wheel or turbine flowmeter.

In this preferred embodiment of the invention, the magnetic coupling 11 between the electric motor 10 and the hydraulic pump 9 is formed by at least two magnets, which in this case are neodymium magnets. Greater driving power is achieved with magnets of this type, since they are more magnetizing than conventional magnets.

Figure 2:
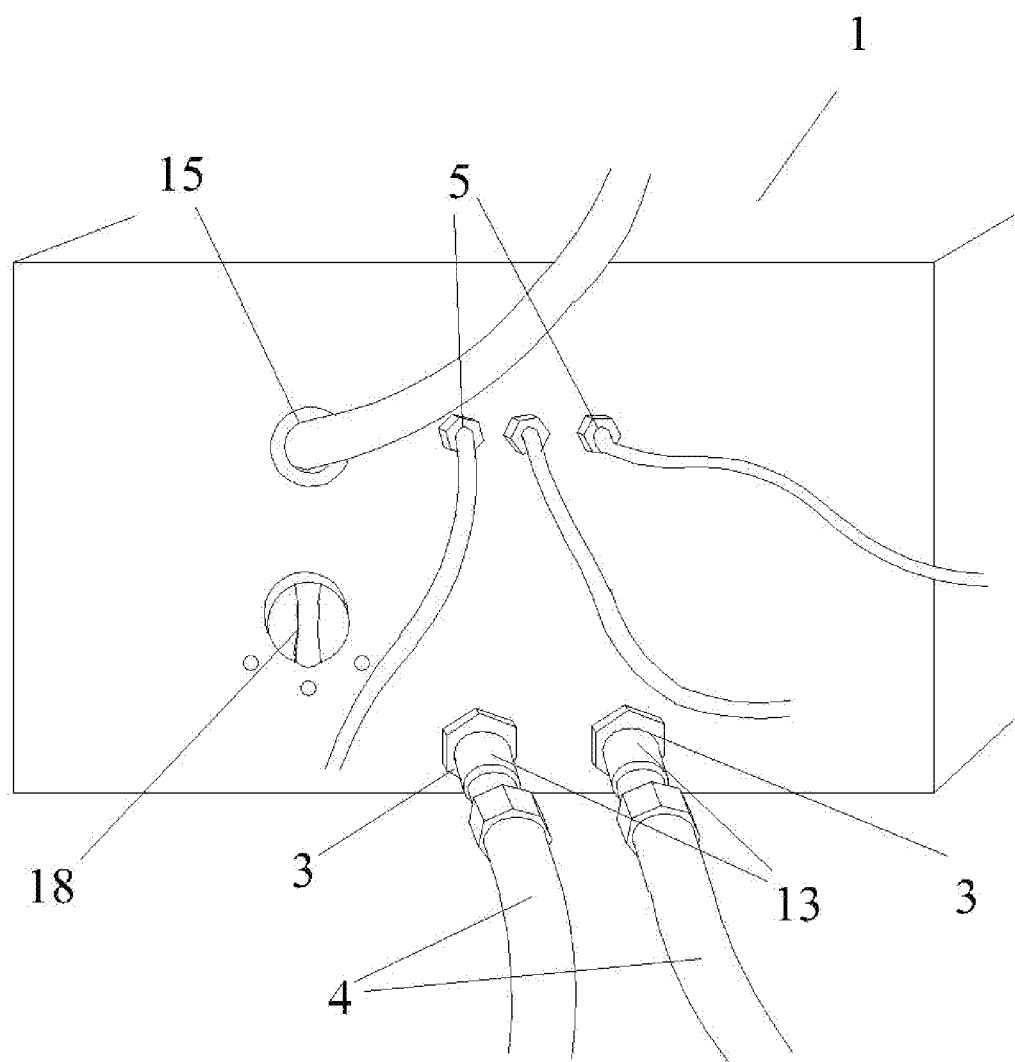
FIG. 2 shows a view from the side of the product metering frame of the chemical product control and metering equipment, for a preferred embodiment of the invention.

As shown in FIG. 2, in this preferred embodiment of the invention, the inlet connections 3 for entry into the metering frame 1 comprise a particle filter 13, although the chemical product to be metered must reach the equipment already free of suspended particles and foreign bodies, to prevent blockages in the flowmeters. Therefore, these particle filters 13 must be checked from time to time and cleaned, if necessary.

In this preferred embodiment of the invention, as can be seen in FIG. 1, each product outlet duct 12 is connected to a blockage detection flowmeter 14, before the outlet connection 5 of the metering frame 1. Likewise, each of these blockage detection flowmeters 14 are in turn connected with the electronic control card, such that the card is in communication with these flowmeters and obtains information from same in order to know whether or not they are blocked, and to know the degree of existing blockage if they are blocked. This information is transmitted to the control panel 2 so that it can be displayed on the display 16 thereof.

Likewise, as shown in FIG. 2 in this preferred embodiment of the invention said metering frame 1 comprises a through hole 15 for power supply means.

On the other hand, in this preferred embodiment of the invention the control panel 2 comprises a charging connector on one of its sides. Therefore, when the battery level indicator shows that the battery is low, the equipment is connected to the cigarette lighter charger of the vehicle. The control panel 2 in turn comprises means for indicating the parameters of the equipment, which are formed by a display 16 and, a potentiometer 17 for regulating the dose of product leaving through the injector.

In this preferred embodiment of the invention, as shown in FIG. 2 the metering frame 1 comprises a selector knob 18 for manually or automatically controlling which of the metering receptacle is chosen.

Therefore, in order to start the operation of the equipment, the control mode must first be selected by means of said selector knob 18. Therefore, there is a need to first check that the equipment is ready to start metering, i.e., to check that it has the product required for metering and that the product is inside the six receptacles which are all full and arranged such that three of them are located on each side of the machine.

The suction tube 4 of the two inlet connections 6 is then introduced in two of the receptacles for chemical product, where each of them is located on a different side of the machine.

The three injectors of the machine are also connected to the three outlet connections 5 of the metering frame 1, taking care to maintain the order and to connect the right-side injector in the connection corresponding to the right-side injector and doing the same with the central injector and the left-side injector.

The metering frame 1 is then connected to power supply means which, in this preferred embodiment of the invention, is a 12 V DC battery, respecting the polarity of the connection. Finally, the selector knob 18 is set for controlling in an automatic mode.

At this time, a first indicator 19 appears on the display of the control panel 2 showing, by means of red color, that the equipment is connected but the pump is in pause, so the control panel 2 is connected by means of a starter switch 22 and the desired dose is regulated by means of the potentiometer 17 for dose regulation and the first indicator 19 of the control panel 2 now shows, by means of green color, that the pump is already in operation.

Figure 3:
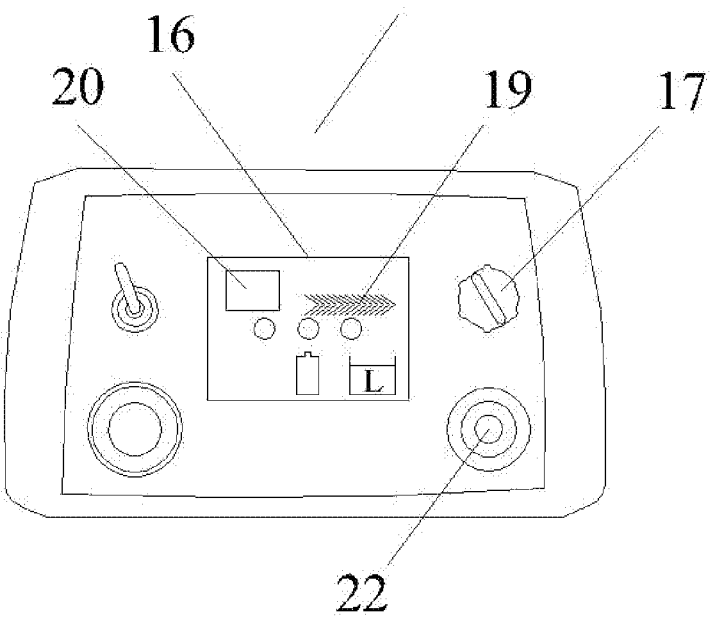
FIG. 3 shows a plan view of the control panel of the chemical product control and metering equipment in the situation of starting the metering, for a preferred embodiment of the invention.

A second indicator 20, as shown in FIG. 3, indicates the dose being applied at a given time, whereas a third indicator 21 shows that the equipment is suctioning chemical product from receptacle L located on the left side of the machine.

Figure 4:
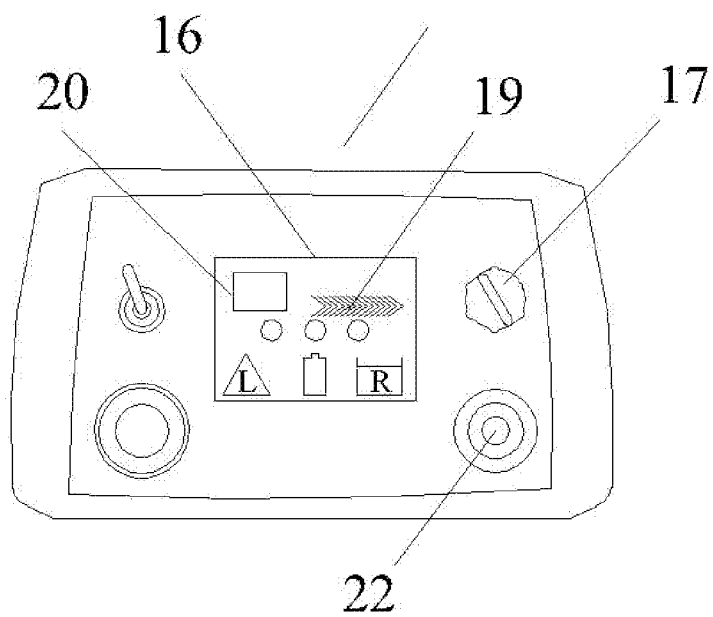
FIG. 4 shows a plan view of the control panel of the chemical product control and metering equipment in the situation of changing a suction receptacle, for a preferred embodiment of the invention.

In the moment in which the product from the left-side receptacle finishes, the electrovalves 7 change the suction to the line of receptacles on the other side, in this case, the right side, and this is again indicated on the display 16 which warns of the need to change the left-side receptacle, and provides information that the rights-side receptacle R is in use, as shown in FIG. 4.

In this preferred embodiment of the invention, the shutdowns performed when changing the direction of the machine are used for removing the suction tube 4 from the empty receptacle of the line on the left side and introducing it in a full receptacle of the same line on the left side.

At that time, the starter switch 22 is pressed for two seconds to clear the receptacle change alarm.

In the case of selecting a manual operation, the process control performed by the control panel 2 is the same as in the automatic mode, with the only difference that when one of the receptacles becomes empty, it does not automatically change to the connected receptacle of the other side of the machine, so in this case it always suctions from the suction tube 4 indicated by means of the mode selector knob 18.

The described embodiment is only an example of the present invention, therefore the specific details, terms and phrases used in the present specification must not be considered limiting, but rather must only be understood as a basis for the claims and as a representative basis providing a comprehensible description as well as sufficient information for the person skilled in the art to apply the present invention.

Significant improvements with respect to the state of the art, both from the viewpoint of metering itself and of the control over said metering, are achieved with the chemical product control and metering equipment for agricultural land disinfection machines herein proposed.

A metering in which chemical product pressuring means is not required for extraction thereof from the receptacle is therefore obtained with this equipment, so the process is greatly simplified. By using a hydraulic pump, a constant flow and pressure is achieved, so an equivalent flow in all the injectors is also achieved.

Furthermore, since the coupling between the pump and the motor does not comprise mechanical force transmission but rather is a magnetic coupling, product leaks through the mechanical closures are prevented.

The electronic control card performs all the flow rate calculations, dose regulations through controlling the power of the motor which controls the pump, the change of suction receptacle and the wireless transmission of all this data to the wireless control panel. All the functions of the equipment can thus be carried out with a single card.

The equipment herein proposed achieves full control of the process from the wireless control panel which allows detecting the needs for changes therein in order to act as quickly as possible, so that the metering performed is correct and efficient.

The invention relates to more economical equipment as it is formed by simple means avoiding the use of hydrogen or similar elements, it is also more efficient as losses are prevented and a controlled metering that is the same in all the injectors and is controlled and monitored at all times is achieved.

The invention claimed is:

1. Chemical product control and metering equipment for agricultural land disinfection machines, having at least two receptacles for containing said chemical product and at least one injector for injecting said chemical product on agricultural land, the chemical product control and metering equipment comprising:

a metering frame having two inlet connections for entry into the metering frame, each with a suction tube of the receptacles for chemical product, and at least one outlet connection for exit to an injector for injecting said chemical product;

wherein the metering frame comprises therein a chemical product inlet duct connected to each of the two inlet connections, an electrovalve at a beginning of each of the two connections, at least one dose control flowmeter connected to said chemical product inlet ducts and to a hydraulic pump, wherein the one dose control flowmeter comprises a paddle wheel;

wherein said hydraulic pump is connected to an electric motor by means of a magnetic coupling and has at least one product outlet duct connected to the at least one outlet connection of the metering frame;

a control panel of the metering frame, wirelessly connected thereto; and an electronic control card, arranged inside the metering frame and connected to the electric motor, the dose control flowmeter and the electrovalves, and wirelessly connected to the control panel, wherein each at least one product outlet duct is connected to a blockage detection flowmeter, before the at least one outlet connection of the metering frame, and wherein each said blockage detection flowmeter is in turn connected with the electronic control card.

2. The chemical product control and metering equipment according to claim 1, wherein the two inlet connections for entry into the metering frame comprise a particle filter.

3. The chemical product control and metering equipment according to claim 1, wherein the magnetic coupling between the electric motor and the hydraulic pump is formed by at least two magnets.

4. The chemical product control and metering equipment according to claim 3, wherein the at least two magnets of the magnetic coupling are neodymium magnets.

5. The chemical product control and metering equipment according to claim 1, wherein the metering frame comprises a through hole for power supply means.

6. The chemical product control and metering equipment according to claim 1, wherein the control panel comprises a charging connector on one of its sides.

7. The chemical product control and metering equipment according to claim 1, wherein the control panel comprises means for indicating the parameters of the equipment formed by a display.

8. The chemical product control and metering equipment according to claim 1, wherein the control panel comprises a potentiometer for regulating the dose of product leaving through the injector.

9. The chemical product control and metering equipment according to claim 1, wherein the metering frame comprises a selector knob manually or automatically controlling which of the at least two receptacles is chosen.

\* \* \* \* \*